CONCURRENT DEPOSITION OF SUPERCONDUCTOR AND DIELECTRIC

Filed Dec. 19, 1966 6 Sheets-Sheet 1

INVENTOR
WILLIAM M. FLOOK, JR.

BY Harry J. McCauley

ATTORNEY

INVENTOR
WILLIAM M. FLOOK, JR.
BY Harry J. McCauley
ATTORNEY

CONCURRENT DEPOSITION OF SUPERCONDUCTOR AND DIELECTRIC

Filed Dec. 19, 1966 6 Sheets-Sheet 3

INVENTOR
WILLIAM M. FLOOK, JR.

BY Harry J. McCauley

ATTORNEY

INVENTOR
WILLIAM M. FLOOK, JR.

BY Harry J. McCauley

ATTORNEY

April 14, 1970 W. M. FLOOK, JR 3,506,483

CONCURRENT DEPOSITION OF SUPERCONDUCTOR AND DIELECTRIC

Filed Dec. 19, 1966 6 Sheets-Sheet 5

INVENTOR
WILLIAM M. FLOOK,JR.

BY Harry J. McCauley

ATTORNEY (34,000X)-SUBSTRATE MAINTAINED AT 300° K (286,000X)-SUBSTRATE COOLED TO 77° K

INVENTOR
WILLIAM M. FLOOK, JR.

BY Harry J. McCauley
ATTORNEY

United States Patent Office 3,506,483
Patented Apr. 14, 1970

3,506,483

CONCURRENT DEPOSITION OF SUPERCONDUCTOR AND DIELECTRIC

William M. Flook, Jr., Greenville, Del., assignor to E. I. du Pont de Nemours and Company, Wilmington, Del., a corporation of Delaware Filed Dec. 19, 1966, Ser. No. 603,028
Int. Cl. B44d *1/02;* C23c *11/02*
U.S. Cl. 117—227 2 Claims

ABSTRACT OF THE DISCLOSURE

The method of manufacturing an improved structured superconductor by the concurrent deposition of a superconductive material with a dielectric material.

Superconductive properties characterize approximately twenty-three metallic elements at cryogenic temperatures, and it has been verified that many compounds and alloys become superconductive at transition temperatures ranging up to about 18° K., which latter high value is possessed by $Nb_3Sn$. The transition temperature, or critical temperature, $T_c$, of a superconductor is defined as that temperature below which the resistance of the substance drops sharply to an immeasurably small value, the material then being said to be in the superconductive state. The superconductive state can be destroyed by application of a, sufficiently high magnetic field, $H_c$, or current density, $J_c$, where the subscripts *c* denote the criticality. $H_c$ and $J_c$ are both temperature-dependent, $H_c$ decreasing as the temperature rises and $J_c$ also decreasing, but at a slower rate.

Superconductive materials have been somewhat arbitrarily classified into so-called "soft" or Class I superconducting materials, of which pure Pb and Sn are examples, these in general exhibiting relatively low $H_c$ values, and "hard," or Class II superconductors, of which $Nb_3Sn$ is an example, which latter possess the ability to withstand particularly high magnetic fields and large electric currents prior to destruction of superconductivity.

It is an interesting property of superconductors that thin films of these substances, while demonstrating a transition temperature very close to that of the bulk material, have a critical field, $H_c$ (and also a critical current, $J_c$) much higher than that of the bulk substance. This phenomonon has been explained to be the result of field penetration of films which are thin compared to the London penetration depth, which latter is defined as that distance from the surface of a bulk superconductor at which the field inside the material has fallen to $1/e$ of the field at the surface (refer "Applied Superconductivity" by V. L. Newhouse (1964), John Wiley, New York, particularly p. 67).

This has led to the fabrication of very thin superconductive films supported, in alternation, by thin layers of insulation, and also to superconductive networks infiltrated at extremely high pressure into the pores of special glasses, all as taught in U.S. Patent No. 3,214,249.

Figure 1A:
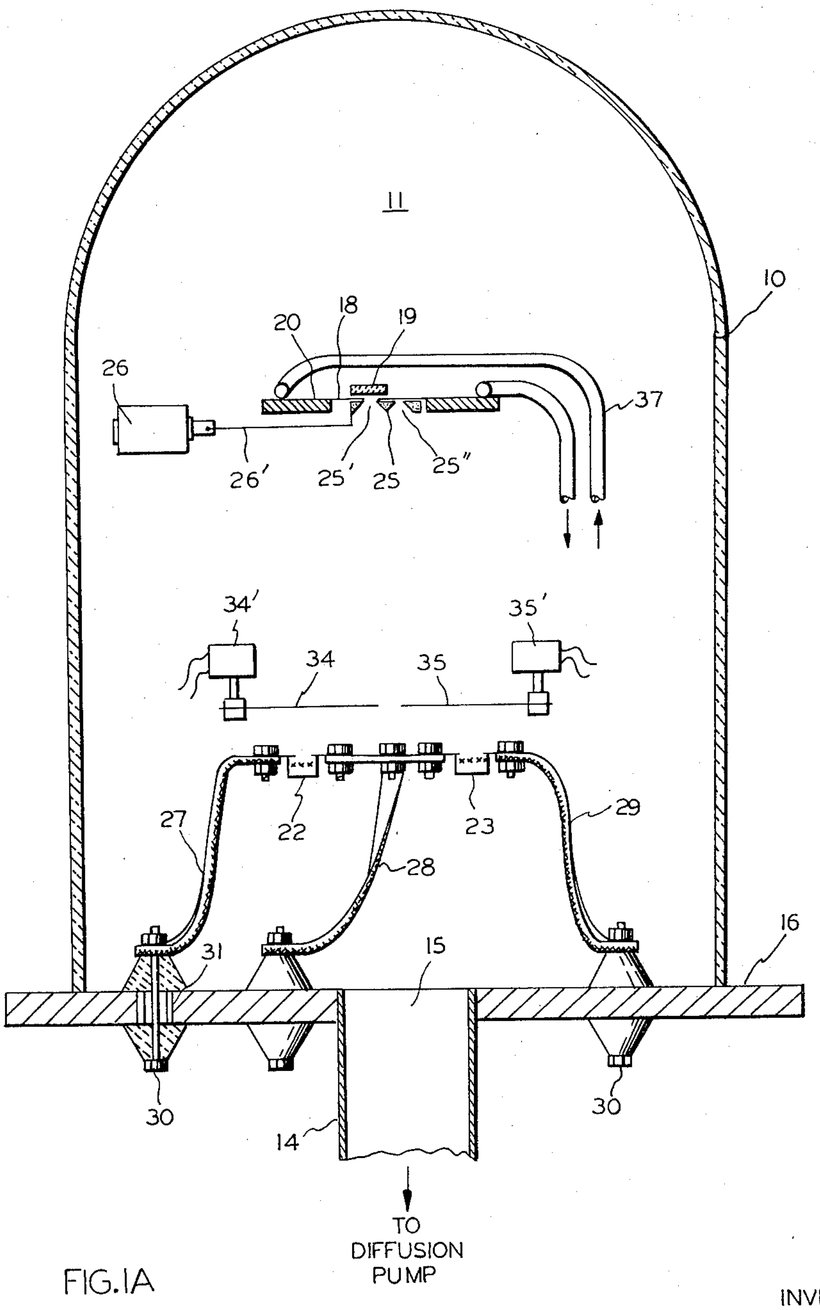
Figure 1B:
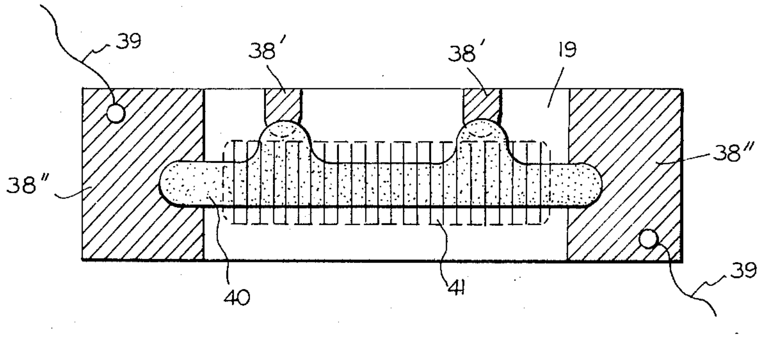
Figure 1C:
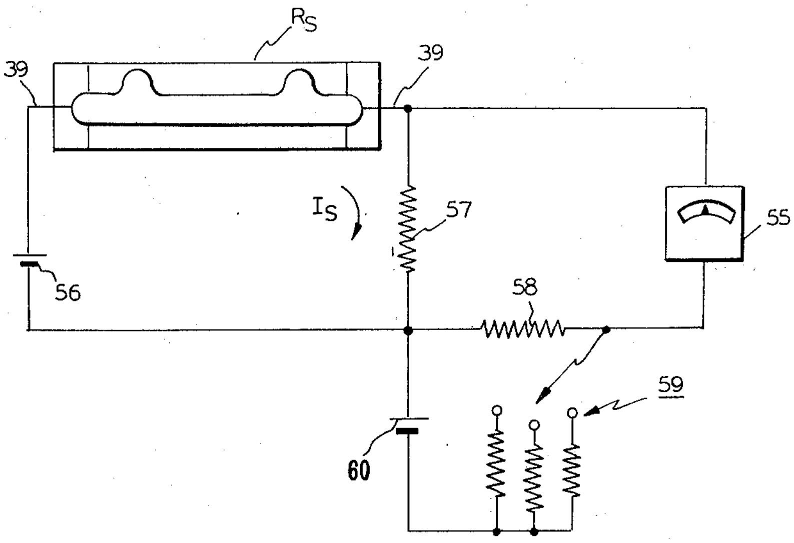
Figure 2:
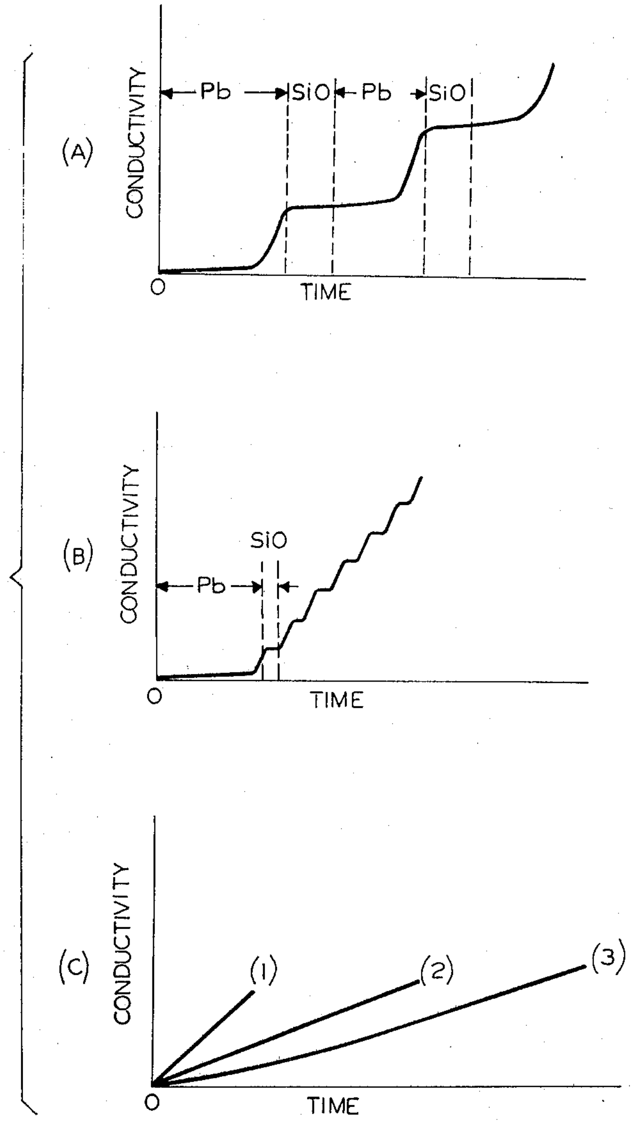
Figure 3:
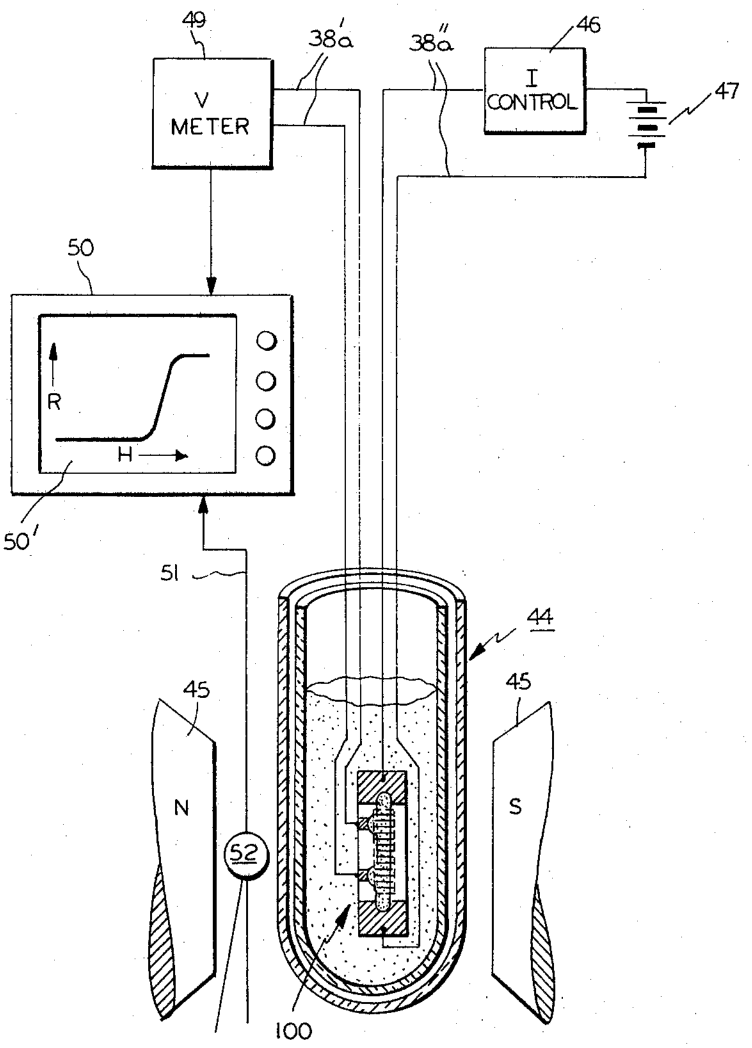
Figure 4:
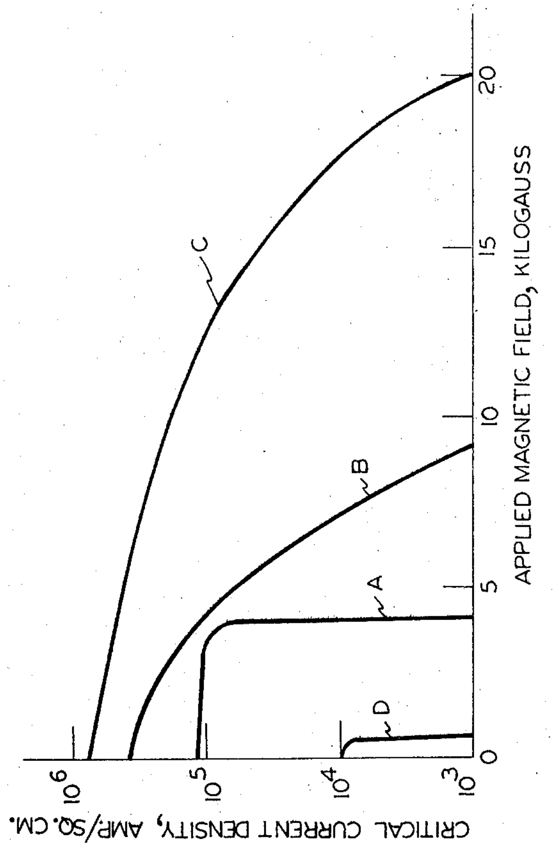
Figure 5A:
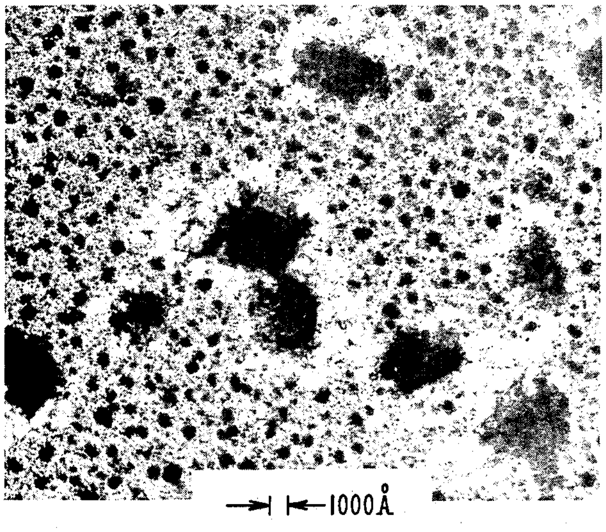
Figure 5B:
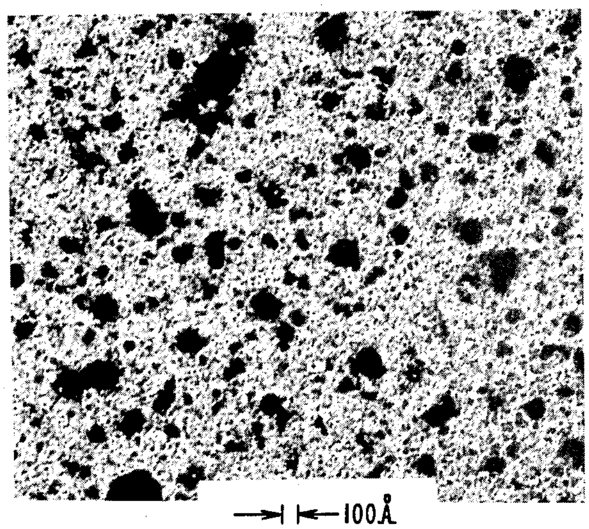

The primary objects of this invention are to provide an improved superconductor and a method of manufacture thereof which is economical and simpler in execution than the methods of manufacture known to the art, and also a method adapted to the obtainment of high reproducibility in the product. The manner in which these and other objects of this invention are attained will become apparent from the detailed description and the drawings, in which:

FIG. 1(A) is a schematic representation in sectional side elevation of a preferred embodiment of apparatus for the manufacture of structured superconductors according to this invention, FIG. 1(B) is a schematic plan view of a structured superconductor according to this invention shown in place on the development support of the apparatus of FIG. 1(A), FIG. 1(C) is a schematic circuit diagram of one type of electrical circuit adapted to monitor the progressive development of structured superconductors, FIGS. 2(A), (B) and (C) are the individual time-conductivity plots determined in the course of the structured superconductor lay-down for two layered specimens, (A) and (B), and for several codeposited specimens (C) prepared according to this invention, FIG. 3 is a schematic view in sectional side elevation of a cryogenic test apparatus for structured superconductors made according to this invention, FIG. 4 is a comparative plot of applied magnetic field v. critical current density for specimens (A), (B) and (C) of FIG. 2 and also a mass superconductor (D) of the same substance (Pb) as a control, and FIGS. 5(A) and 5(B) are microphotographs of superconductors laid down according to this invention wherein the substrate was maintained at 300° K. and 77° K., respectively.

Generally, this invention consists of a superconductor structure comprising essentially an intimate association on a microscopic-submicroscopic scale of a conductive substance possessing the characteristic of transition to the superconductive state at low absolute temperatures and a dielectric material, together with a method for its manufacture.

At the outset it will be understood that close reproducibility of electrical properties of superconductors intended for industrial use is absolutely indispensable, because utilization in solenoids and similar apparatus requires precisely established values of $H_c$, $J_c$ and other parameters in order to afford standardization in manufacture. A very serious problem, from this standpoint, is that processes such as vapor deposition laydown of materials are heavily influenced by relatively uncontrollable factors such as, for example, ambient pressures and temperatures, cleanliness of the substrate, temperature of the vaporization source, momentary concentration of vapor in the incident streams, angle of incidence of the vapor streams, nature of the substrate and the particular nature of any residual gases in the evaporation chamber. The quantitative effects of most of these variables are not known with certainty and, in addition, it is not possible, at least economically, to exert close control over all of them. Under the circumstances, careful monitoring of the conductivity of structured superconductors is vital and, fortunately, this has proved to be simultaneously entirely adequate as a manufacturing control technique applicable to my invention.

It might be mentioned that attempts in the prior art to obain electrically conductive films of thicknesses below about 200 A. and of the required continuity and purity have been hampered by poor reproducibility and difficulty in obtaining adherence of the conductor to the substrate. Moreover, it is not practicable to conduct precise measurements of film thickness at these low dimensional limits as a basis for corrective steps in the manufacture.

One observed difficulty is the normal tendency for thin films to form initially as irregular agglomerated sites, rather than as smooth, continuous layers. Accordingly, I have departed from the film concept of superconductor structuring and have resorted instead to the fabrication of intimate associations of the superconductor and dielectric on a microscopic or even submicroscopic scale, utilizing solid evaporation techniques such as those described generally in "Vacuum Deposit of Thin Films" by L. Holland (1960), John Wiley & Sons, Inc., New York, publishers, modified, however, to operate concurrently in effecting metallic and dielectric phase laydown.

The following detailed experimental work relates to superconductive structures fabricated from Pb (transition temp. 7.2° K.) as conductor in association with SiO as dielectric, although this invention is by no means limited to this specific system.

Referring to FIG. 1, there is shown schematically a preferred embodiment of vapor deposition apparatus for carrying out the method of this invention, wherein the development of the structured superconductor is effected under a bell jar 10, the interior 11 of which is evacuated to a level of, typically, lower than $10^{-5}$ torr my a diffusion pump (not shown) having its suction intake 14 connected with centrally located port 15 provided in support plate 16, constituting the floor of the deposition chamber.

Within the upper half of the chamber, at a separation of, typically, 18″ from the vapor-source sub-assemblies 22 and 23, hereinafter described, is the horizontally disposed substrate 19 upon the exposed lower face of which it is desired to lay down the superconductive structure of this invention. Substrate 19 is preferably made of 1 mm. thick Pyrex, quartz or ceramic clamped or otherwise fixed to a stationary support 20 maintained at a fixed vertical level within bell jar 10 through an intermediary electric insulator 18, typically stiff strips of polyethylene terephthalate. A pattern-defining aperture plate 25, machined longitudinally with two spaced vapor-throughput slits 25′ and 25″ (typically about 2.2 cm. long x 1.5 mm. wide), movable laterally under the control of solenoid 26 provided with plunger 26′ attached at one end of plate 25, is interposed between sources 22 and 23 and substrate 19 closely adjacent the latter. The shapes of the slits 25′ and 25″ were machined so that, for fabrication of a layered superconductive structure such as that detailed in FIG. 1(B), the aperture of slit 25′ reserved for Pb deposition defined Pb layers of the somewhat longer pattern indicated at 40 in FIG. 1(B), whereas the aperture of slit 25″ defined the somewhat broader dielectric layers denoted at 41.

Source sub-assemblies 22 and 23 are resistance heaters of conventional design, and thus not detailed herein, preferably fabricated from a refractory metal, such as zirconium, powered via electrical conductors 27, 28 and 29 connected through insulated vacuum-tight bolt terminals 30 inserted through drilled passageways 31 in support plate 16. Each source is preferably provided with an individual Chromel-Alumel thermocouple, not shown, as a check on temperature maintenance.

Additionally, there are provided horizontally pivotable vapor path shutters 34 and 35 rotatable across the straight line sight connecting sources 22 and 23 with substrate 19 to, at will, mask off one or the other of slits 25′ or 25″, actuation of the shutters being effected by solenoids 34′ and 35′, respectively, at the choice of the operator through external controls not shown, similar operating controls being also provided for solenoid 26.

It is preferred to chill substrate 19 during the vaporization deposition process in order to minimize migration of the deposited atoms at the substrate, and this is conveniently effected by indirect cooling obtained by circulation of liquid nitrogen through a coil 37 shown broken through its upper coil structure, upper turn positions of which are in firm contact with the outer peripheral expanse of thermally conductive support 20 (typically copper) and also with the back of substrate 19. With the relative areas of substrate 19 and support 20 approximately shown in FIG. 1(A), and when liquid $N_2$ cooling was employed, substrate 19 could be maintained at a fairly constant temperature of about 77° K. during the deposition process.

As shown in FIG. 1(B), the underside of substrate 19 is provided with permanent fired-on electrodes 38′, 38′ and 38″, 38″ to which electrical leads, such as 39, are attached, permitting control monitoring and finished product testing as hereinafter described.

The apparatus was first utilized to prepare a 10-layer (i.e., 10 metal layers) structured superconductor of general size 2 cm. long x 2 mm. wide consisting of alternated layers of Pb 40 separated one from another by SiO insulative layers 41, without any tunneling or short-circuiting between layers. No substrate liquid nitrogen cooling was employed in this instance, although the substrate temperature remained substantially constant at approximately 300° K. during laydown. The superconductor structure was built up by placing reagent grade Pb in the receptacle of vapor source assembly 22 and ultrapure SiO in the receptacle of vapor source 23, after which chamber 10 was evacuated to an absolute pressure of $5\times10^{-6}$ torr. Aperture plate 25 and shutters 34 and 35 were then carefully aligned in the positions shown in FIG. 1(A), atfer which vaporization current (4.75 amp.) was supplied to vapor source 22, heating the lead charge to 890° C., corresponding to a 37 mv. signal voltage on the Chromel-Alumel thermocouple associated with this source. This caused the Pb to evaporate at a steady rate and shutter 34 was then opened at a time selected as zero for the laydown operation, commencing the deposition of the first Pb layer at a rate of 8.3 A./sec. on substrate 19. The resistance of each Pb layer deposited in turn was continuously monitored by the circuit shown schematically in FIG. 1(C), which is a type of potentiometric ohmmeter circuit incorporating a recorder 55 having an indication span equivalent to 0–10 mv. This recorder was initially calibrated to read in ohms resistance by first substituting for the structured superconductor $R_s$ a standard resistance of 1340 ohms. Then, with the 1.34 v. Hg battery 56 in circuit, a current $I_s$ is passed through resistor 57 (typically 10 ohms), at which time recorder 55 was adjusted to full scale.

As is customary, a protective shunt resistor 58 (also typically 10 ohms) was provided in series connection with one lead running to recorder 55 and a conventional zero suppression sub-circuit, indicated generally at 59, was connected in parallel with resistor 58 through bucking voltage source 60 (typically a 1.34 v. Hg. battery) in order to obtain constant pen deflection per unit $1/R$. In operation, the current through the superconductor could vary from about 0.1 ma. for $R_s=13{,}000$ ohms to about 10 ma. for $R_s=130$ ohms.

For the superconductor described, deposition of Pb was continued until a resistance of 180 ohms was attained, which occurred after about 30 secs. operation.

Shutter 34 was thereupon closed to effectively bar Pb vapor passage beyond the shutter level, aperture plate 25 shifted leftwards and shutter 35 opened to start deposition of insulative SiO at 11 A./sec. from vapor source 23, heated to a temperature of 1260° C., corresponding to a signal of 51 mv. magnitude developed in its associated Chromel-Alumel thermocouple. Buildup of an insulative layer 41 then ensued, after which the cycle was repeated in accordance with the schedule detailed in Table I for the first four layers, repeated through the full ten metal layer development of the specimen.

TABLE I

| Layer No. | Material | Layer thickness, A. | Source temp., ° C. | Time to lay down, sec. | Lay-down rate A/sec. | Substrate Temp. |
|---|---|---|---|---|---|---|
| 1 | Pb | 250 | 890 | 30 | 8.3 | 300 (° K.) |
| 2 | SiO | 165 | 1,260 | 15 | 11 | 300 (° K.) |
| 3 | Pb | 250 | 890 | 30 | 8.3 | 300 (° K.) |
| 4 | SiO | 165 | 1,260 | 15 | 11 | 300 (° K.) |

Referring to FIG. 2(A), it is seen that, following the laydown of each successive finite layer of SiO, substantially equal intervals of time elapsed during which the conductivity did not change, even though Pb was being deposited continuously, and this period of time (typically, 25 secs.) was equivalent to a continuous Pb layer at the vaporous Pb evolution rate maintained of average thickness no less than 200 A. However, since conduction was not established through the freshly applied Pb layer in course of laydown until after the substantial delay period reported, the Pb was obviously being deposited as nucleates during this interval. Films characterized by thick regions as large as those reported exceed the London penetration thickness requirements over much or all of their expanses and this is confirmed by the critical current density v. applied magnetic field evaluation measurements made with the cryogenic apparatus shown schematically in FIG. 3.

This apparatus comprised a conventional open Dewar flask 44 containing a quantity of boiling He (B.P. 4.2° K.) supported in fixed position between the poles 45, 45 of a high intensity magnet, in this instance a Magnion electromagnetic capable of providing a field of up to 23 kilogauss strength. The specimen to be tested, indicated generally at 100, was provided with leads attached as one pair to terminals 38' and as a second pair to terminals 38'', which leads are denoted in FIG. 3 by the same respective reference numerals with an *a* suffix appended. During the test the specimen was immersed centrally of the poles 45, 45, so that the magnetic field was applied transverse and parallel to the plane of the specimen.

The outside ends of leads 38*a''* were connected in current supply circuit through current control means 46, which was a variable resistor in the form of a solid state power transistor having a current regulation capability in the range of about 0–2 amps., to the opposite terminals of a D-C voltage source 47, which was a heavy duty truck storage battery. Similarly, the voltage testing leads 38*a'*, 38*a'* were connected in series with a microvoltmeter 49, which can be a Keithley Model 10A generating a voltage output signal proportional to the input applicable to the *y* or ordinate axis of an *x*, *y* plotter 50. The *x* (or abscissa) axis input was derived via lead 51 from a Rawson flux meter 52 disposed centrally of one of the poles 45.

The superconductivity test was performed on the specimen after it had attained stability at the He boiling point temperature. Then, with a constant current of, typically, 0.01–1.0 amp. applied to the specimen, the magnetic field across poles 45 was increased stepwise from zero to maximum, under which conditions the variation in voltage (actually plotted as the corresponding resistance) as a function of magnetic field was recorded by the *x*, *y* plotter. The step increase in specimen resistance occurring in the typical test record reproduced as 50', FIG. 3 indicates that the critical field intensity $H_c$ has been attained, and plots of the applicable critical current densities $J_c$ v. applied magnetic field gave traces such as those plotted in FIG. 4. Thus, trace A is that for the layered specimen having the conductivity characteristic of FIG. 2(A), which specimen demonstrated a capability for carrying current of about $10^5$ ampere/sq. cm. at 4,000 gauss field strength with zero resistance at 4.2° K., which represents a marked improvement over the bulk material having the much lower capability plotted as control D of FIG. 4.

It was reasoned that one might conceivably obtain a disproportionate advantage in superconductivity by sacrificing film form integrity for appleciable short-circuiting of successive metal deposits if, at the same time, very thin localized metal laydowns were simultaneously employed. Accordingly, a 10 metal layer trial specimen was prepared following the identical procedure hereinbefore described for the specimen of FIG. 2(A), except that the deposition time for each SiO laydown was reduced from 15 secs. to only 5 secs. while the Pb vapor exposures were reduced even more drastically from 30 secs. to only 3–7 secs. for all Pb depositions after the first. A monitoring conductivity test was conducted during the development of this structured superconductor and the step-by-step performance shown in FIG. 2(B) resulted. This plot reveals that, after the initial Pb deposition of about 220 A. thickness, the monitored conductivity increased at a much greater rate over that of FIG. 2(A) and, most surprisingly, there was a practically immediate increase in conductivity at the threshold of each Pb metal laydown, even though these deposits were clearly completely discontinuous, and filamentary rather than layer-like.

The superconductivity performance of the FIG. 2(B) specimen was determined by a test in the cryogenic apparatus of FIG. 3, employing the same procedure already described for the layered specimen of FIG. 2(A). A substantial improvement in characteristics was achieved, as represented by plot B, FIG. 4. It was particularly noted that abrupt change from the superconductive state to the normal resistive state with increase in applied field was no longer experienced, change in critical conductivity rather occurring in a progressive manner along a smooth curve. Not only was superconductivity preserved, although for low critical current, up to the relatively high level of about 9 kilogauss, but there existed higher current densities than for the FIG. 2(A) speicmen at all field values. A conversion of resistance (conductivity) measurements obtained in the monitoring test to equivalent Pb deposit thicknesses for the FIG. 2(B) specimen revealed the following.

| Layer No.: | Thickness, A. |
|---|---|
| 1 | 250 |
| 2 | 30 |
| 3 | 40 |
| 4 | 40 |
| 5 | 50 |
| 6 | 60 |
| 7 | 70 |
| 8 | 75 |
| 9 | 80 |
| 10 | 70 |

Thus, while continuous metal layers could not possibly have been laid down, the deposits which were made were clearly very thin and closer to the applicable London penetration depth. Nevertheless, the reasons for early conductivity during the laydown process are not fully understood, although it might have been due to the fact that incomplete layering of the SiO produced a surface roughness which, in some unexplained way, permitted the nucleating islands of Pb to touch, so that metallic conduction then occurred at a greatly reduced Pb mass laydown.

Postulating that particle-by-particle build up of a metallic network of extreme attenuation and irregularity further approaching the molecular size state might yield an even greater improvement in superconductivity, concurrent laydown of both metallic Pb and SiO was resorted to. Linear, as distinguished from step, conductivities were monitored with this technique, as shown in FIG. 2(C), where plot (1) is the conductivity for a 75% Pb-25% SiO by weight composition, plot (2) is the conductivity of a 50% Pb-50% SiO composition and plot (3) is the conductivity of a 25% Pb-75% SiO specimen. A vastly increased superconductivity was obtained, as shown by curve C, FIG. 4, which is the measured characteristic for the 50%–50% SiO specimen.

It is apparent from the conductivity-time monitoring plots of FIG. 2, and particularly plot (C), which relates to the structures of this invention, that the monitoring technique hereinbefore described is very dependable as a guide in the laydown of superconductors, especially where good reproducibility is essential. One is thereby enabled to preselect rates of deposition of both conductive substance and dielectric with a high degree of confidence in the properties of the resulting products.

Electron micrographs, such as those shown in FIG. 5, reveal the benefits attained by cooling substrate 19 to very low temperatures. Thus, although both specimens 5(A) and 5(B) were developed by concurrent vapor deposition of metallic Pb at a rate of about 15 A./sec. and dielectric SiO at about 15 A./sec., a much finer-grained and more homogeneous structure was achieved for the 5(B) specimen, the substrate for which was sub-cooled to 77° K., whereas 5(A) was laid down at room temperature, i.e., 300° K. The contrast is all the more apparent in view of the fact that FIG. 5(A) has a magnification of 34,000×, whereas FIG. 5(B) has a magnification of 286,000×, the dimensional relationships of which are denoted by the respective 1000 A. and 100 A. reference scales reproduced adjacent each of the views. It is believed that intense sub-cooling of the substrate reduces migration of the vaporous components composing the superconductor and insures a more random laydown of both metal and dielectric.

From the magnifications employed, the method of manufacture utilized and the conductivities finally achieved, the superconductors of this invention can be characterized as a highly attenuated network of microscopic and even submicroscopic conductor paths which are formed in situ by welded particle-to-particle buildup from the vaporous state simultaneously with the laydown of dielectric material in fused particle-to-particle abutment therewith. For purposes of claiming, the size scale is therefore described as "microscopic-submicroscopic" to denote the heterogeneity in this respect.

Preferably, the average transverse thickness of the individual conductor paths of such metal networks should be in the range of about 20 A. to about 100 A., and this is readily attained by sub-cooling the substrates before vapor deposition laydown of the components.

The enhancement in superconductivity of the Class I substances as a result of structuring according to this invention is so great that, on the basis of performance, they qualify as Class II materials, with great advantages in cost, physical properties, such as ductility, and the like.

It will be understood that the technique of this invention is not limited to the employment of the specific substances Pb and SiO chosen as the example detailed, but can be applied to any materials, elemental, alloy or compound, which are amenable to vapor deposition.

What is claimed is:

1. The method of manufacturing a superconductive structure comprising concurrently vaporizing a conductive substance possessing the characteristic of transition to the superconductive state at low absolute temperatures along with a substantially uniformly distributed dielectric material, condensing said conductive substance and said dielectric material upon a common substrate to form a microscopic-submicroscopic welded particle-to-particle highly attenuated network of said conductive substance supported in situ by said dielectric material deposited in fused particles-to-particle abutment therewith, monitoring the electrical conductivity with time of said structure in the course of laydown and preselecting the rates of said vaporizing of said conductive substance and said dielectric material as a function of said monitoring.

2. The method of manufacturing a superconductive structure according to claim 1 wherein said substrate is subcooled to a temperature in which said highly attenuated network has an average transverse thickness of individual conductor paths in the range of about 20 A. to 100 A.

References Cited

UNITED STATES PATENTS

| | | | |
|---|---|---|---|
| 2,808,351 | 10/1957 | Colbert et al. | 117—211 |
| 3,023,727 | 3/1962 | Theodoseau et al. | 117—217 X |
| 3,055,775 | 9/1962 | Crittenden et al. | 117—212 |
| 3,058,851 | 10/1962 | Kahan | 117—217 X |
| 3,091,556 | 5/1963 | Behendt et al. | 117—213 |
| 3,100,723 | 8/1963 | Ween | 117—217 |
| 3,113,889 | 12/1963 | Cooper et al. | 117—212 X |
| 3,214,249 | 10/1965 | Bean et al. | 29—180 |
| 3,228,794 | 1/1966 | Ames | 117—212 |

ANDREW G. GOLIAN, Primary Examiner

U.S. Cl. X.R.

117—107